United States Patent
Blossey et al.

(10) Patent No.: US 7,938,872 B2
(45) Date of Patent: May 10, 2011

(54) DEVICE FOR SEPARATING PARTICLES FROM A GAS STREAM

(75) Inventors: Werner Blossey, Benningen (DE);
Torsten Fritzsching, Vaihingen (DE);
Mario Rieger, Freiberg (DE); Bernhard Klotz, Winnenden (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/443,637

(22) PCT Filed: Sep. 20, 2007

(86) PCT No.: PCT/EP2007/059924
§ 371 (c)(1),
(2), (4) Date: Feb. 11, 2010

(87) PCT Pub. No.: WO2008/040639
PCT Pub. Date: Apr. 10, 2008

(65) Prior Publication Data
US 2010/0139633 A1 Jun. 10, 2010

(30) Foreign Application Priority Data
Oct. 2, 2006 (DE) .................... 20 2006 015 231 U

(51) Int. Cl.
*B01D 45/12* (2006.01)
(52) U.S. Cl. ................ 55/345; 55/346; 55/347; 55/396; 55/399; 55/456; 55/447
(58) Field of Classification Search ............ 55/345–347, 55/396, 399, 447–450, 456
See application file for complete search history.

(56) References Cited

U.S. PATENT DOCUMENTS

| | | | | |
|---|---|---|---|---|
| 1,338,143 | A * | 4/1920 | McGee | 95/269 |
| 1,909,184 | A * | 5/1933 | Lissman | 55/300 |
| 3,061,994 | A * | 11/1962 | Mylting | 55/346 |
| 3,448,563 | A * | 6/1969 | Sobeck | 55/347 |
| 3,915,679 | A * | 10/1975 | Roach et al. | 55/347 |
| 3,930,816 | A | 1/1976 | Miczek | |
| 3,990,870 | A * | 11/1976 | Miczek | 95/217 |
| 4,141,705 | A | 2/1979 | Campolong | |
| 4,158,449 | A * | 6/1979 | Sun et al. | 244/136 |
| 4,255,174 | A * | 3/1981 | Simpson | 55/347 |
| 4,537,608 | A * | 8/1985 | Koslow | 55/337 |
| 4,746,340 | A | 5/1988 | Durre | |
| 6,797,026 | B2 * | 9/2004 | Sechrist et al. | 55/348 |

(Continued)

OTHER PUBLICATIONS

PCT International Search report for international application dated Feb. 1, 2008.

*Primary Examiner* — Jason M Greene
*Assistant Examiner* — Dung Bui

(57) ABSTRACT

The invention concerns a separating device for separating particles (4) from a gas stream (2) in which the gas stream (2) by means of a guiding device is caused to rotate and the liquid or solid particles (4) to be separated are removable by a particle outlet. The separating device (1) is comprised of a cylindrical housing pipe (5) with a guiding device (3) and an immersion pipe (6) arranged in alignment with the flow direction of the gas stream (2) in the housing pipe (5) which immersion pipe is provided on the exterior with a spiral (7) for a directed removal of the particles (4) separated by rotation to a housing opening (8) and with a central outlet (9) for the purified gas stream (2).

15 Claims, 3 Drawing Sheets

U.S. PATENT DOCUMENTS

| | | | |
|---|---|---|---|
| 6,884,273 B2 * | 4/2005 | Kopec et al. | 55/346 |
| 6,932,849 B2 * | 8/2005 | Sheidler et al. | 55/347 |
| 6,991,664 B2 * | 1/2006 | Riehmann et al. | 55/321 |
| 7,244,282 B2 * | 7/2007 | Greif et al. | 55/347 |
| 7,258,727 B2 * | 8/2007 | Greif et al. | 95/269 |
| 7,316,733 B1 * | 1/2008 | Hedrick et al. | 95/269 |
| 7,491,254 B2 * | 2/2009 | Krisko et al. | 55/337 |
| 2005/0016138 A1 * | 1/2005 | Sheidler et al. | 55/347 |
| 2005/0150200 A1 * | 7/2005 | Koene et al. | 55/456 |

* cited by examiner

US 7,938,872 B2

DEVICE FOR SEPARATING PARTICLES FROM A GAS STREAM

TECHNICAL FIELD

The invention concerns a device for separating particles from a gas stream, in particular for separating liquid or solid particles, for example, oil or dust, in accordance with the preamble of the independent claim.

PRIOR ART

DE 190 42 219 A1 discloses, for example, an oil separating device for separating oil from so-called blow-by gases that escape as combustion gases due to leaks in the crankcases of an internal combustion engine. In these oil separators the oil components are separated on flow obstacles on which the oil particles in the gas stream can deposit.

Moreover, DE 103 23 343 A1 discloses a separating device that is of a two-stage configuration and has two cyclone devices connected in series through which the gas stream to be purified passes after it has been caused to rotate by vanes. By means of a matched size relation of the two cyclone devices the volume flow range as well as the separating degree can be affected and the removal of the separated particles can be realized by laterally circumferentially extending annular spaces between an immersion pipe and the housing pipe through which the gas flow passes.

SUMMARY OF THE INVENTION

The invention is based on a separating device for separating particles from a gas stream where the gas stream is caused to rotate by means of a guiding device and the liquid or solid particles to be separated are removable by means of an outlet. According to the invention, the separating device is advantageously comprised of a substantially cylindrical or, caused by its manufacture, slightly conical (draft angle) housing pipe with a guiding device and comprised of an immersion pipe that is arranged in alignment with the flow direction of the gas stream in the housing pipe which immersion pipe is externally provided with a spiral for a directed removal of the particles, separated by rotation, to a housing opening and furthermore provided with a central outlet for the gas stream that has been purified.

The housing pipe and the internally positioned immersion pipe are preferably of a cylindrical configuration and generally are mounted in a horizontal position. The particles to be separated can be removed at the bottom.

In that the proposed separating device is provided with an immersion pipe having a spiral contour, the particles to be separated can be removed, guided by means of the spiral, through a correspondingly designed housing opening out of the separating device in a targeted fashion. The circumferentially extending annular and frequently clogging gap between the housing parts that has been used for this purpose in the past is therefore no longer required; this provides a significant improvement of the degree of separation and a reduction of the mounting space for the separating device, in particular when several cyclone devices are arranged in an array. Also, with the invention a reduction of air resistance in the gas stream can be realized easily.

Moreover, the possibility of centering the housing pipe by means of the immersion pipe when assembling the parts is also advantageous for a variety of applications, in particular when the immersion pipe with the spiral tapers conically inwardly and projects into the housing pipe.

According to the invention, on the immersion pipe a guide channel can be formed at the outlet of the spiral in a simple way that, matching the opposite wall of the housing pipe, leads to the housing opening for removal of the separated particles. In a simple way, the guide channel extending to the housing opening can be formed by a slanted portion of a circumferential area of the immersion pipe.

Moreover, it is as advantageous when the guiding device for forcing the rotation of the gas stream and thus for generating the cyclones is formed by a configuration in the form of an upright turbine vane at the end of the housing pipe opposite the immersion pipe at the intake of the gas stream.

An advantageous application of the invention results when an array of separating devices is formed in that a housing part of the array contains a plurality of immersion pipes and, correspondingly, a housing part has a matching number of immersion pipes that can be joined for forming the array.

In particular the separating devices or an array of separating devices can be an oil separator for separating oil in blow-by gases of a crankcase in an internal combustion engine.

BRIEF DESCRIPTION OF THE DRAWINGS

The invention will be explained with the aid of the drawings. It is shown in.

EMBODIMENT(S) OF THE INVENTION

Figure 1:
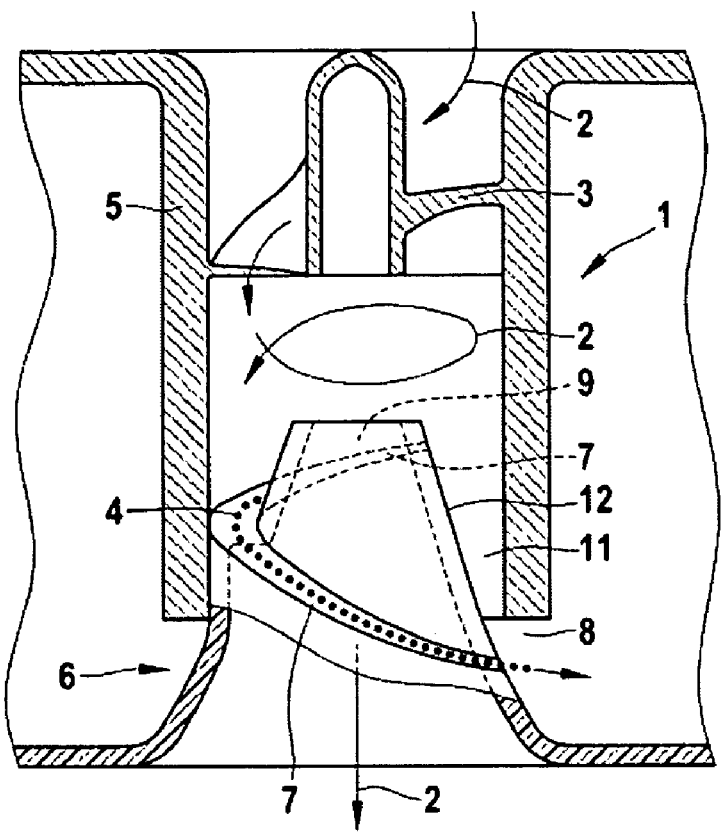
FIG. 1 a longitudinal section of a separating device according to the invention with an immersion pipe arranged in a housing pipe.

In FIG. 1 a separating device 1 for separating particles from a gas stream 2 is shown in which the gas stream 2 by means of a guiding device 3, here in the form of an upright turbine vane, is caused to rotate. As a result of rotation of the gas stream 2 the particles 4 to be separated are first forced against the wall of a generally cylindrical housing pipe 5 and then guided to the immersion pipe 6 arranged below.

The immersion pipe 6 has externally a substantially conical configuration, with the exception of the cylindrical areas for centering the housing pipe 5, and has a spiral 7 by means of which the liquid or solid particles 4 to be separated are guided to a lateral housing opening 8 between the immersion pipe 6 and the housing pipe 5 for a targeted removal of the particles 4 separated by rotation.

The immersion pipe 6 has a central outlet 9 for the gas stream 2 that is now purified. Moreover, the immersion pipe 6, as mentioned before, tapers with the spiral 7 conically inwardly and projects into the housing pipe 5.

Figure 2:
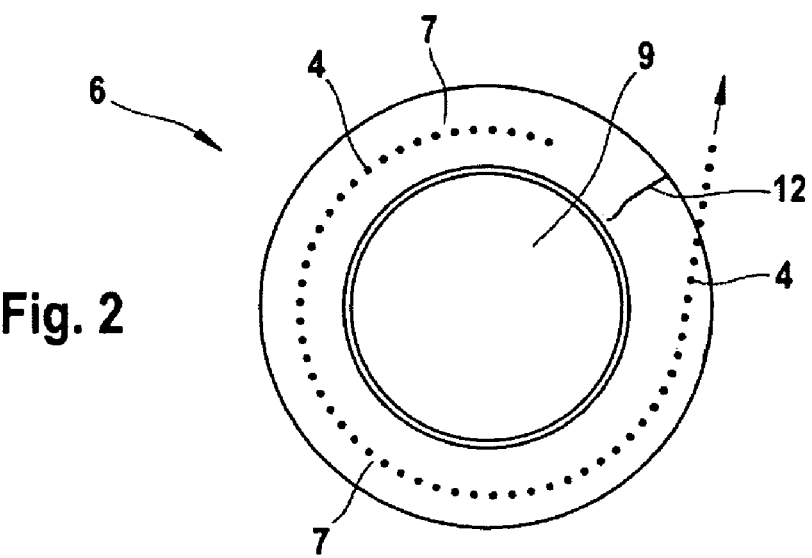
FIG. 2 a plan view onto the immersion pipe according to FIG. 1.
Figure 3:
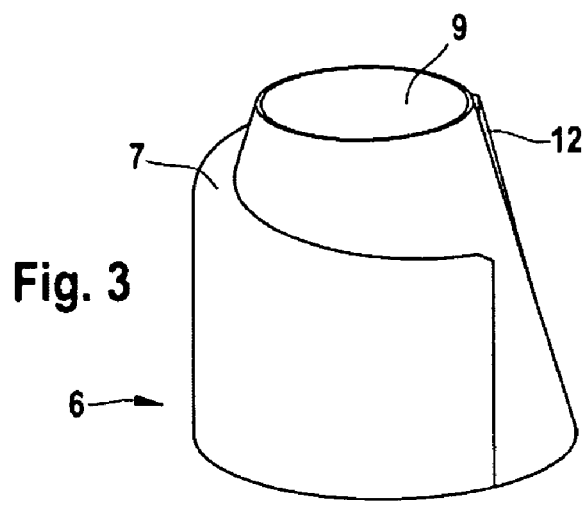
FIG. 3 a perspective view of the immersion pipe according to FIG. 1.

On the immersion pipe 6 a guide channel 11 at the outlet of the spiral 7 can be formed for a targeted supply of the particles 4 in that a slanted portion 12 of a circumferential area is provided on the immersion pipe 6, as is shown in particular in the illustration of the immersion pipe 6 according to FIG. 2 and in the perspective illustration according to FIG. 3.

Figure 4:
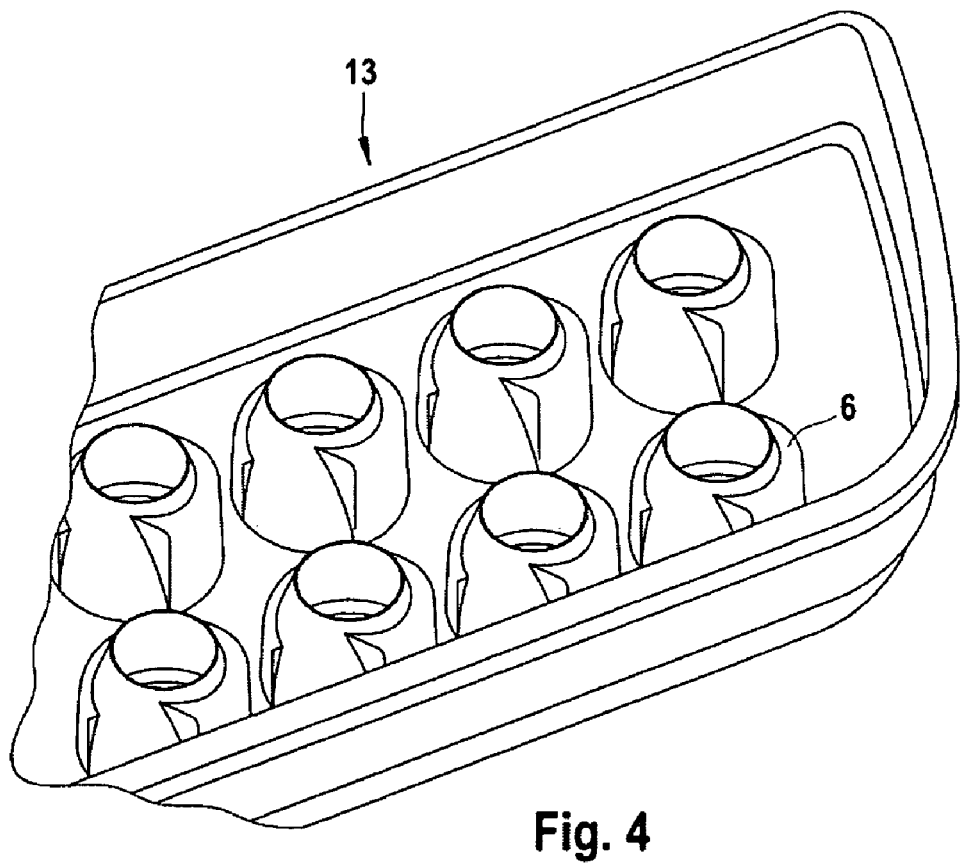
FIG. 4 is an arrangement of several immersion pipes according to FIG. 3 as a component of an array.

A further embodiment of the invention is illustrated in FIG. 4 in which an array 13 of separating devices is formed in that a housing part of the array 13 comprises a plurality of immersion pipes 6 and, correspondingly, a housing part (not shown) with a matching number of housing pipes can then be attached. In this connection, the separating device 1 according to FIGS. 1 to 3 or the array 13 of separating devices according to FIG. 4 can be, for example, a dust preseparation arrangement in an air intake system for an internal combustion engine in a motor vehicle.

Figure 5:
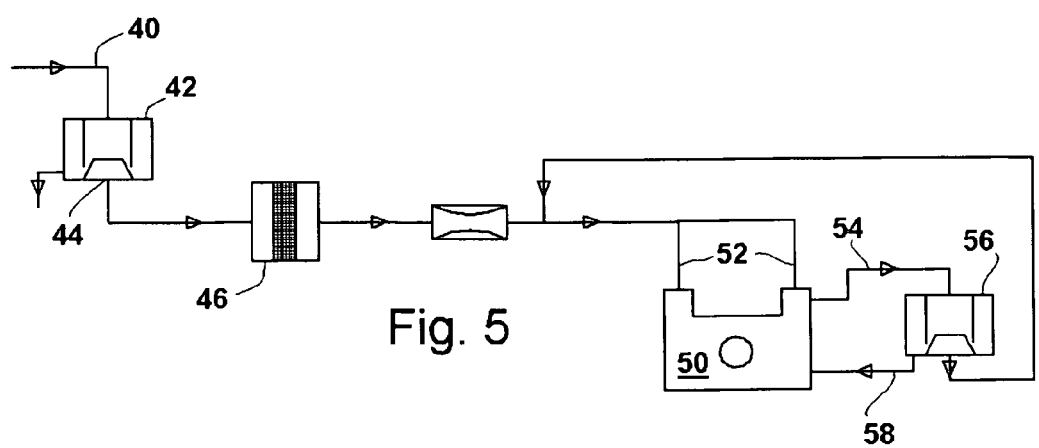
FIG. 5 is a schematic diagram illustrating one exemplary application with the separating devices applied to an air intake system and for separating oil from crankcase blow-by gases.

FIG. 5 is a schematic diagram illustrating one particular application of separating device as claimed in claims 8 and 9. The separating devices or array of separating devices (such as 13 on FIG. 4) is schematically illustrated as may be applied with internal combustion engine 50. Separating device or devices 42 receive intake are 40. Purified gas (air with particulates removed) from the central outlet 44 to the air filter assembly 46, then from the air filter 46 to the engine 50 through intake tract portion 52. Advantageously, separating device or devices 42 form a dust preseparation arrangement in the air intake tract of internal combustion engine 50. Also shown is separating device or device 56 applied as an oil separator for separating oil in blow-by gases 54 of a crankcase of internal combustion engine 50. Blow-by gases 54 flow from the crankcase of engine 50 to the separating device or devices 56. Oil is removed by separating device or devices 56 and returns 58 to the crankcase of engine 50. Purified gases flow from the separating device 56 through the central outlet (schematically shown at the bottom of 56) and returned into the air intake tract 52 of the engine 50.

The invention claimed is:

1. Separating device for separating particles (4) from a gas stream (2) in which the gas stream (2) by means of a guiding device is caused to rotate and the liquid or solid particles (4) to be separated are removable by a particle outlet, wherein the separating device (1) comprises:
   a housing pipe (5) with a guiding device (3) and
   an immersion pipe (6) arranged in alignment with the flow direction of the gas stream (2) in the housing pipe (5),
   wherein the immersion pipe is provided on the exterior with a spiral (7) for a directed removal of the particles (4) separated by rotation to a housing opening (8) as a particle outlet,
   wherein the spiral (7) is formed on an upstream facing face of a cylindrical wall portion of said immersion pipe (6), said cylindrical wall portion received into and abutting an interior wall of said housing pipe (5),
   wherein a conically inwardly tapered end of said immersion pipe has a central outlet (9) for discharge of the purified gas stream (2) through an interior passage of said immersion pipe,
   wherein said immersion pipe (6) between with the spiral (7) and said central outlet (9) tapers conically inwardly and projects into the housing pipe (5), a conically tapered end of said immersion pipe (6) having a central outlet (9) for the purified gas stream (2).

2. Separating device according to claim 1, characterized in that the housing pipe (5) and the inwardly positioned immersion pipe (6) are at least partially cylindrical with the immersion pipe (6) positioned at the bottom, respectively.

3. Separating device according to claim 1, characterized in that the immersion pipe (6) with the spiral (7) tapers conically inwardly and projects into the housing pipe (5).

4. Separating device according to claim 3, characterized in that in the immersion pipe (6) a guide channel is formed at the outlet of the spiral (7) which guide channel, in correspondence with the oppositely positioned wall of the housing pipe (5), forms the housing opening (8) for the separated particles (4).

5. Separating device according to claim 4, characterized in that the guide channel extending to the housing opening (8) is formed by a slanted portion (12) of a circumferential area on the immersion pipe (6).

6. Separating device according to claim 1, characterized in that the guiding device (3) is formed by an upright turbine vane at the end of the housing pipe (5) located opposite the immersion pipe (6) at the intake of the gas stream (2).

7. Separating device according to claim 1, characterized in that an array (13) of separating devices (1) is formed in that a housing part of the array (13) comprises a plurality of immersion pipes (6) and, correspondingly, the housing part has a matching number of housing pipes (5) that can be joined for forming the array (13).

8. Separating device according to claim 1, characterized in that the separating devices or an array of separating devices forms a dust preseparation arrangement in an air intake system for an internal combustion engine.

9. Separating device according to claim 1, characterized in that the separating devices or an array of separating devices forms an oil separator for separating oil in blow-by gases of a crankcase of an internal combustion engine.

10. A separating device for separating particles (4) from a gas stream (2) in which the gas stream (2) by means of a guiding device is caused to rotate and the liquid or solid particles (4) to be separated are removable by a particle outlet, wherein the separating device (1) comprises:
   a substantially cylindrical housing pipe (5) with a guiding device (3) and
   an immersion pipe (6) arranged in alignment with the flow direction of the gas stream (2) in the housing pipe (5);
   wherein a spiral particle track (7) is formed on an upstream facing face of a cylindrical wall portion of said immersion pipe (6), said cylindrical wall portion received into and abutting an interior wall of said cylindrical housing pipe (5);
   wherein a guide channel (11) is formed between a slanted conically tapered portion (12) of said immersion pipe (6) and said interior wall of said housing pipe (5);
   wherein said guide channel (11) terminates at a housing opening (8) arranged at an end of said housing pipe (5), said housing opening (8) formed between said cylindrical housing pipe (5) and said conically tapered portion (12) of said immersion pipe (6);
   wherein said spiral particle track (7) directs removal of the particles (4) separated by rotation to said housing opening (8) as said particle outlet;
   wherein a conically inwardly tapered end of said immersion pipe (6) has a central outlet (9) for discharge of the purified gas stream (2);
   wherein said immersion pipe (6) between the spiral (7) and said central outlet (9) tapers conically inwardly and projects into the housing pipe (5).

11. The separating device according to claim 10, wherein said guiding device (3) is formed by an upright turbine vane at the end of said housing pipe (5) located opposite said immersion pipe (6) at said intake of the gas stream (2).

12. A separating system comprising:
   a housing having:
      a first housing part having a plurality of immersion pipes formed thereon;
      a second housing part having a plurality of housing pipes formed thereon, said plurality of housing pipes configured and aligned to match with said plurality of immersion pipes to form an array of separating devices of claim 10;

wherein said separating devices are arranged to process said gas stream in parallel.

13. The separating system according to claim 12, wherein each separating device, the guiding devices (3) is formed by an upright turbine vane at the end of said housing pipe (5) located opposite said immersion pipe (6) at said intake of the gas stream (2).

14. The separating system according to claim 12, wherein said separating system forms a dust preseparation arrangement in an air intake system for an internal combustion engine.

15. The separating system according to claim 12, wherein said separating system forms an oil separator for separating oil in blow-by gases of a crankcase of an internal combustion engine.

\* \* \* \* \*